United States Patent
Bentley

(10) Patent No.: US 10,733,057 B2
(45) Date of Patent: Aug. 4, 2020

(54) TECHNIQUES FOR APPLICATION UNDO AND REDO USING SQL PATCHSETS OR CHANGESETS

(71) Applicant: Bentley Systems, Incorporated, Exton, PA (US)

(72) Inventor: Keith A. Bentley, Elverson, PA (US)

(73) Assignee: Bently Systems, Incorporated, Exton, PA (US)

( * ) Notice: Subject to any disclaimer, the term of this patent is extended or adjusted under 35 U.S.C. 154(b) by 403 days.

(21) Appl. No.: 14/928,614

(22) Filed: Oct. 30, 2015

(65) Prior Publication Data
US 2017/0123934 A1 May 4, 2017

(51) Int. Cl.
| | | |
|---|---|---|
| *G06F 11/00* | (2006.01) | |
| *G06F 11/14* | (2006.01) | |
| *G06F 16/28* | (2019.01) | |
| *G06F 16/23* | (2019.01) | |

(52) U.S. Cl.
CPC ...... *G06F 11/1451* (2013.01); *G06F 16/2358* (2019.01); *G06F 16/2379* (2019.01); *G06F 16/284* (2019.01); *G06F 2201/84* (2013.01)

(58) Field of Classification Search
CPC combination set(s) only.
See application file for complete search history.

(56) References Cited

U.S. PATENT DOCUMENTS

| | | | |
|---|---|---|---|
| 6,543,006 B1 * | 4/2003 | Zundel | G06F 11/141 714/15 |
| 6,618,851 B1 | 9/2003 | Zundel et al. | |

(Continued)

FOREIGN PATENT DOCUMENTS

WO    WO-01-90954 A2    11/2001

OTHER PUBLICATIONS

"Notification of Transmittal of the International Search Report and the Written Opinion of the International Searching Authority, or the Declaration," International Filing Date: Oct. 4, 2016, International Application No. PCT/US2016/055288, Applicant: Bentley Systems, Incorporated, dated Dec. 12, 2016, pp. 1-12.

(Continued)

*Primary Examiner* — Farhan M Syed
(74) *Attorney, Agent, or Firm* — Cesari and McKenna, LLP; James A. Blanchette

(57) ABSTRACT

In one embodiment, undo and redo operations of an application are implemented using patchsets or changesets. When changes are made by the application, a transaction is performed against a relational database including one or more changes to reflect the changes made by the application. The one or more changes are tracked to produce a set of tracked changes. In response to detecting the transaction is to be committed, the set of tracked changes is converted to a patchset or changeset. The patchset or changeset is stored to a transaction table and the transaction committed. In response to a request to undo the changes made by the application, the one or more changes of the patchset or changeset are inverted to produce an inverted patchset or changeset, that is then applied. In response to a request to redo the changes made by the application, the patchset or changeset is applied as is.

17 Claims, 16 Drawing Sheets

(56) References Cited

U.S. PATENT DOCUMENTS

| | | | | |
|---|---|---|---|---|
| 6,718,218 B1* | 4/2004 | Matheson | ............... | G06F 30/00 |
| | | | | 700/95 |
| 8,229,871 B2* | 7/2012 | Woolf | .................... | G06F 30/00 |
| | | | | 706/45 |
| 8,751,526 B1* | 6/2014 | Bentley | ................ | G06F 16/244 |
| | | | | 707/769 |
| 8,903,779 B1 | 12/2014 | Holenstein et al. | | |
| 8,965,900 B2 | 2/2015 | Bentley et al. | | |
| 8,977,598 B2 | 3/2015 | Montulli et al. | | |
| 2009/0177703 A1 | 7/2009 | Cuneo et al. | | |
| 2009/0182707 A1 | 7/2009 | Kinyon et al. | | |
| 2011/0107246 A1* | 5/2011 | Vik | ........................ | G06F 9/451 |
| | | | | 715/771 |
| 2011/0161054 A1* | 6/2011 | Woolf | .................... | G06F 17/00 |
| | | | | 703/1 |
| 2011/0191299 A1* | 8/2011 | Huynh Huu | ............ | G06F 16/00 |
| | | | | 707/646 |
| 2013/0013268 A1* | 1/2013 | Woolf | .................... | G06F 17/00 |
| | | | | 703/1 |

OTHER PUBLICATIONS

"Apply a Changeset to a Database," SQLite C Interface, Draft, SQLite, <http://www.sqlite.org/sessions/session/sqlite3changeset_apply.html>, retrieved on Oct. 16, 2015, pp. 1-3.

"The Architecture of SQLite," SQLite, <http://www.sqlite.org/arch.html>, retrieved on Oct. 16, 2015, pp. 1-4.

\* cited by examiner

```
{Table="Element" :
    {Delete: ElementId=2, ClassId=22, Model=1, Category=2, Code="ov1", Geometry={oval}, Location={2,9}},
    { Insert : ElementId=4, ClassId=21, Model=2, Category=3, Code="e4", Geometry={triangle}, Location={6.5,6}},
    { Update : ElementId=1, {Old: Location={2,9}}, {New: Location={4.5,9}}}
},
{Table="Model" :
    { Insert : ModelId=2, Code="Eng:Other", Descr="other", Props={up="north"}}
},
{Table="Category" :
    { Insert : CategoryId=3, Code="orgs", Descr="accs", Props={...}, Color={yellow}}
}
```

Element 810

| Element ID | Class ID | Model ID | Category ID | Code | Geometry | Location |
|---|---|---|---|---|---|---|
| 1 | 22 | 1 | 2 | "e1" | {oval} | {4,5,9} |
| 3 | 12 | 1 | 1 | "e3" | {shape} | {4,5,6} |
| 4 | 21 | 2 | 3 | "e4" | {triangle} | {6,5,6} |

Model 820

| Model ID | Code | Descr | Props |
|---|---|---|---|
| 1 | "Eng:Main" | "main" | {lock="false"} |
| 2 | "Eng:Other" | "other" | {up="north"} |

Category 830

| Category ID | Code | Descr | Props | Color |
|---|---|---|---|---|
| 1 | "parcels" | "muni" | {...} | {blue} |
| 2 | "labels" | "anno" | {...} | {orange} |
| 3 | "orgs" | "accs" | {...} | {yellow} |

FIG. 8

{Table="Element" :
　{Delete: ElementId=3, ClassId=12, Model=1, Category=1, Code="albert", Geometry={shape}, Location={4,5,6}}
},
{Table="Category" :
　{Update : CategoryId=3, {Old: Color={yellow}}, {New: Color={green}}}
}

FIG. 10

```
{Table="Element" :
    { Insert: ElementId=3, ClassId=12, Model=1, Category=1, Code="albert", Geometry={shape}, Location={4,5,6}}
  },
},
{Table="Category" :
    { Update: CategoryId=3, {Old: Color={green}}, {New: Color={yellow}}}
}
```

*FIG. 12*

```
{Table="Element" :
    {Insert : ElementId=2, ClassId=22, Model=1, Category=2, Code="ov1", Geometry={oval}, Location={2,9}},
    { Delete: ElementId=4, ClassId=21, Model=2, Category=3, Code="e4", Geometry={triangle}, Location={6.5,6}},
    { Update : ElementId=1, {Old: Location={4.5,9}}, {New: Location={2,9}}}
},
{Table="Model" :
    {Delete: ModelId=2, Code="Eng:Other", Descr="other", Props={up="north"}}
},
{Table="Category" :
    {Delete: CategoryId=3, Code="orgs", Descr="accs", Props={...}, Color={yellow}}
}
```

TECHNIQUES FOR APPLICATION UNDO AND REDO USING SQL PATCHSETS OR CHANGESETS

BACKGROUND

Technical Field

The present disclosure relates generally to undo and redo operations, and more specifically to techniques for implementing undo and redo operations using patchsets or changesets.

Background Information

Relational databases are electronic databases that store related data in tables of rows and columns, and allow links to be established between tables that have matching fields, such that multiple tables may be simultaneously queried. Many relational data-bases utilize a version of the SQL language, a special-purpose programming language adapted to manage data storage. SQL statements may be executed by a relational data-base system implemented by a self-contained programming library integrated within an application. For example, SQL statements may be executed by the SQLite® embedded SQL database system, available in the public domain. Alternatively, SQL statements may be executed by a relational database system that executes as a separate process and is accessed by an application. For example, SQL statements may be executed by a MySQL® database system available open source, an Oracle Database available from Oracle Corp., or a Microsoft SQL Server database system available from Microsoft Corp.

Among other uses, relational database systems (e.g., SQL database systems) may be used to store application data (e.g., computer aided design (CAD) data) for software applications (e.g., CAD applications), operating as a standardized persistence format for the application data. For example, in a CAD application, when a project is initially designed, the CAD application may create a set of tables having rows that store elements, models, and other information related to the project. In response to changes to the project by the CAD application, the rows of the data tables may be changed, for example, to add rows, remove rows or modify rows.

Storing application data using a relational database system may have advantages over other storage approaches. For example, by using a relational database as a standardized persistence format, independent from the particular memory layout employed by the application, greater interoperability and opportunity for data reuse may be provided. In particular, applications that store data originating from multiple domains (such as certain CAD applications) may especially benefit, as it may enable schemas to be created and modified independent of the application that originally created the data.

While storing application data using a relation database may have benefits, it does present various problems. Some of these problems stem from a difference between how application data is persistently stored to a relational database and how in-memory copies of the application data are maintained. An application may no longer have a complete view of how its data is written to persistent storage. One manifestation of this problem can be seen in the implementation of undo and redo operations.

Many applications (including many CAD applications) enable a user to undo (i.e. reverse) a recent set of changes by triggering an undo operation in the user interface of the application. Subsequently, if they so desire, the user may redo (i.e. reinstate) the set of changes by triggering a redo operation in the user interface. With conventional applications that manage their own persistent storage of data, undo and redo operations may be implemented rather simply. The application can journal each of the changes it writes to persistent storage in binary objects (e.g., "undo blobs" or "redo blobs"). To implement an undo or redo operation, the application interprets the appropriate blob, and reverses or reinstates the writes it made to persistent storage.

However, when a relational database (e.g., an SQL database) is used as the persistence format, these techniques are typically not available. The statements the application sends to the relational database system often do not describe all the modifications made by the relational database system to the data. For example, the application may send a statement to the relational database system to delete all rows of a particular table that are more recent than a particular date (e.g., in SQL, a statement such as DELETE FROM table 2 WHERE date>?). Such a statement may cause many rows (e.g., 1000's of rows) to be deleted from the particular table. However, if the application simply journals the statement, it will not retain a record of the actual modifications made by the relational database system (e.g., the actual rows deleted), and will not be able to reverse the changes.

Accordingly, there is a need for an efficient and effective technique for implementing undo and redo operations in an application that utilizes a relational database as its persistence format.

SUMMARY

Example techniques are provided for implementing undo and redo operations using patchsets or changesets in an application that utilizes a relational database as its persistence format. The techniques utilize a low-level change tracking mechanism of a relational database system to track changes, atomically store a patchset or changeset to the relational database along with the changes, and then utilize the patchset or changeset (directly, or in an inverted form) to perform the undo or redo operations.

In one example embodiment, an undo operation is implemented in an application (e.g., a CAD application) that stores application data (e.g., elements, models, categories, etc.) using a relational database system (e.g., an SQL database system) comprised of one or more data tables (e.g., an element table, a model table, a category table, etc.). In response to changes made by the application (e.g., based on user input in a user interface of the application, or programmatically) a transaction is initiated that includes one or more changes (e.g., inserts, deletes or updates) to be performed on the one or more data tables. A module (e.g., a change-tracker module) of the relational database system detects when the transaction is initiated (e.g., in response to an SQL BEGIN statement), and tracks the one or more changes of the transaction. The module detects when the transaction is to be committed (e.g., using an OnCommit method that detects an SQL COMMIT statement) and then converts the set of tracked changes to the data tables into a patchset or changeset. The patchset or changeset is atomically stored to a TXN table of the relational database in the transaction. In this manner, there will always be one row in the TXN table for every reversible set of changes to the database.

Subsequently, a request to undo the changes (e.g., issued by the application in response to a user-selection of an undo interface element in its user interface, or programmatically) may be received. In response to the request to undo, the module inverts the one or more changes of the patchset or changeset (e.g., converts any inserts into deletes, converts any deletes into inserts, and reverses the effect of any updates) to produce an inverted patchset or changeset, and the inverted patchset or changeset is applied to the relational database to undo the one or more changes to the data tables. Still later, a request to redo the changes (e.g., issued by the application in response to a user-selection of a redo interface element in its user interface, or programmatically) may be received by the relational database system. In response to the request to redo, the patchset or changeset in its original form is applied to the relational database to redo the one or more changes to the data tables.

During an undo or redo operation, one or more table handlers of the application may ensure any in-memory copies of the application data (e.g., stored in volatile memory) are synchronized with the data tables of the relational database (e.g., stored in a persistent storage device). The table handlers detect events generated when the changes of the undo or redo are made to the one or more data tables of the relational database. In response to the events, the table handlers trigger the application to update relevant portions of the in-memory copy of the application data related to those data tables.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which:

FIG. 7 is an example first patchset that is produced by a change-tracker module in response to detecting the first transaction;

FIG. 8 is a listing of updated data tables showing the effects of the first transaction being committed against the data tables of FIG. 5;

FIG. 10 is an example second patchset that is produced by the change-tracker in response to detecting the second transaction;

FIG. 12 is an example inverted second patchset that is produced by the change-tracker module in response to a request from the application to undo the changes of the second transaction;

FIG. 14 is an example inverted first patchset that is produced by the change-tracker module in response to a request from the application to undo the changes of the first transaction.

DETAILED DESCRIPTION

Definitions

As used herein, the term "patchset" refers to a description of one or more changes made to one or more rows of one or more tables of a relational database, where the description includes the original values of one or more fields of the rows.

As used herein, the term "changeset" refers to a description of one or more changes made to one or more rows of one or more tables of a relational database, where the description includes the original values of one or more fields of the rows and the changed values of those fields.

Example Embodiments

Figure 1:
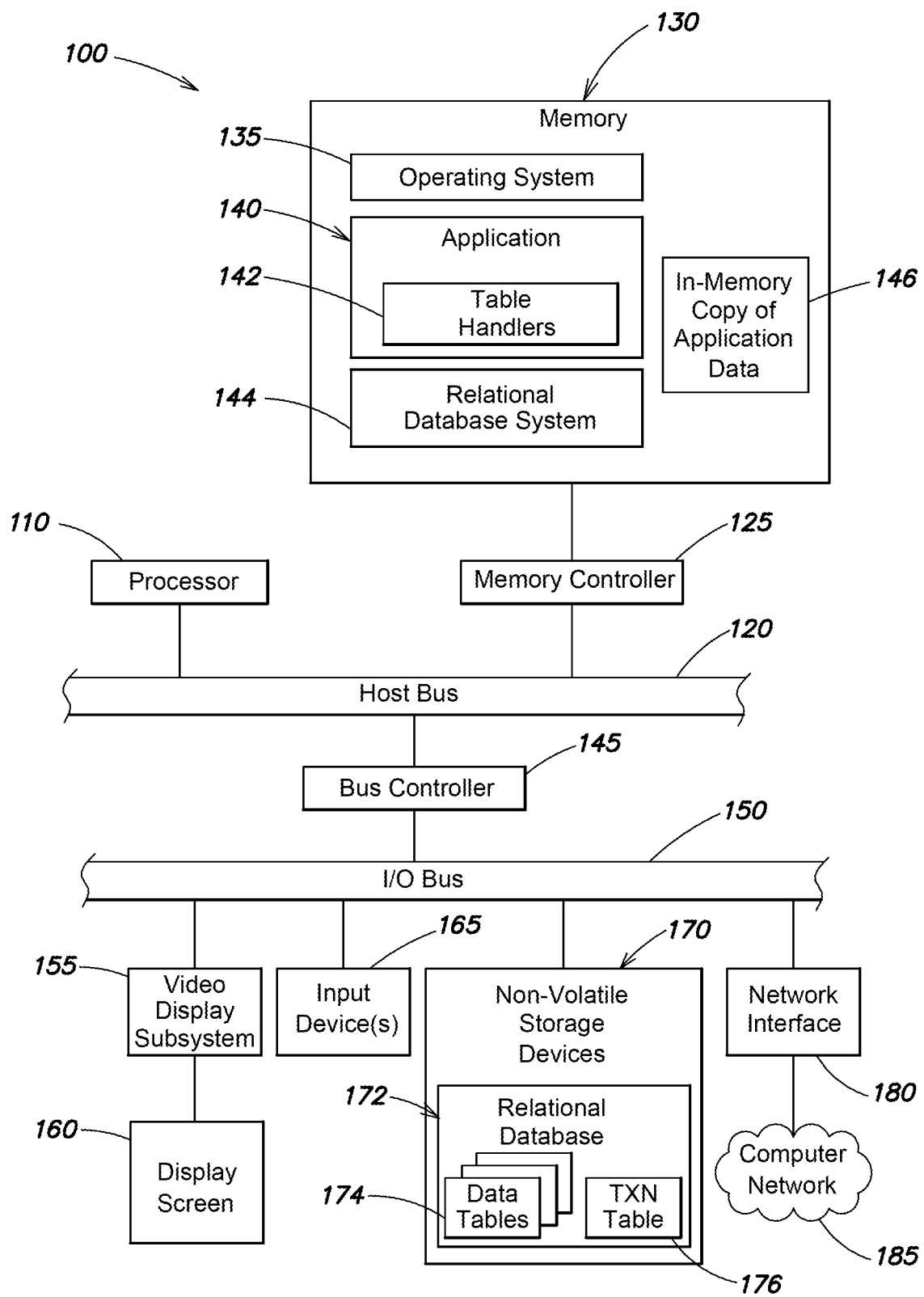
FIG. 1 is a block diagram of an example electronic device in which at least some of the presently described techniques may be employed.

FIG. 1 is a block diagram of an example electronic device 100 in which at least some of the presently described techniques may be employed. The electronic device may be designed for stationary operation (e.g., may be a desktop computer), or may be a portable electronic device (e.g., a notebook computer, a tablet computer, etc.) designed to be readily transported by a user and utilized from a variety of different locations. The electronic device 100 includes at least one processor 110 coupled to a host bus 120. A volatile memory 130, such as a random access memory (RAM), is coupled to the host bus 120 via a memory controller 125 and configured to store an in-memory copy of software and data. The in-memory copy of software may include executable instructions for an operating system 135, an application 140 and table handlers 142 thereof, and a relational database system 144 and modules thereof (see FIGS. 2A and 2B), among other software. Such software is loaded into the volatile memory 130 when needed from persistent copies of the software (not shown) maintained on a non-volatile storage device 170 (e.g., a hard disk, a solid-state drive, etc.) The in-memory copy of data may include an in-memory copy of at least some application data 146 used by the application 140, copied from one or more data tables 174 of a relational database 172 persistently maintained on the nonvolatile storage device 170.

The host bus 120 of the electronic device 100 is coupled to an input/output (I/O) bus 150 through a bus controller 145. A video display subsystem 155 that includes a display screen 160 is coupled to the I/O bus 150. The display screen 170 may show a user interface of the application 140, as well as user interfaces of other software executed on the electronic device 100. One or more input devices 165 (e.g., a mouse, keyboard, touch sensor, etc.) are also coupled to the I/O bus 150. The input devices 165, among other uses, are used to select interface elements in the user interface of the application 140. The above-discussed non-volatile storage device 170, and a network interface 180, are further coupled to the I/O bus 150. The network interface 180 may be coupled to a computer network 185 (e.g., the Internet) to allow for communication between the electronic device 100 and other electronic devices, using any of a number of well-known networking protocols, thereby enabling various distributed, collaborative or remote computing configurations. It should be understood that, according to such configurations, some, or all, of the software and data shown resident in memory 130 or stored in the non-volatile storage device 170 may be remotely located on another electronic device, and accessed via the computer network 185.

In various implementations, the application 140, relational database system 144, the application data and other software and data of the electronic device 100, may take on various forms. In one specific implementation, the application 140 may be a CAD application, such as the Bentley® infrastructure modeling environment, available from Bentley Systems, Inc., and the application data may be a CAD description of a physical structure (e.g., a building, plant, roadway, etc.). The application data may include elements that describe individual units of a structure (e.g., building, plant, roadway, etc.), organized into models that group together related elements into larger units, and defined by categories that include properties common among types of elements. For example, a simple CAD description of a building may consist of several separate models that represent floors of the building. Each such model may include a collection of elements that describe specific finer-grain details of that floor, such as elements that represent walls, doors, windows, furniture, etc. An element that represents a specific door may be associated with a category of doors. The element that represents the specific door may include properties unique to that door, while the category of doors may include properties common to all doors.

The application data (e.g., elements, models, categories, etc.) may be persistently stored in the data tables 174 of the relational database 172 (e.g., in an element table, a model table, a category table, etc.) In one specific implementation, the relational database 172 may be an SQL database, and the relational database system 144 may be an SQL database system (e.g., the SQLite® embedded SQL database system). It should be understood that, while shown as a separate block in FIG. 1, the relational database system (e.g., the SQL database system) 144 may be implemented as a programming library integrated within the application 140.

Figure 2A:
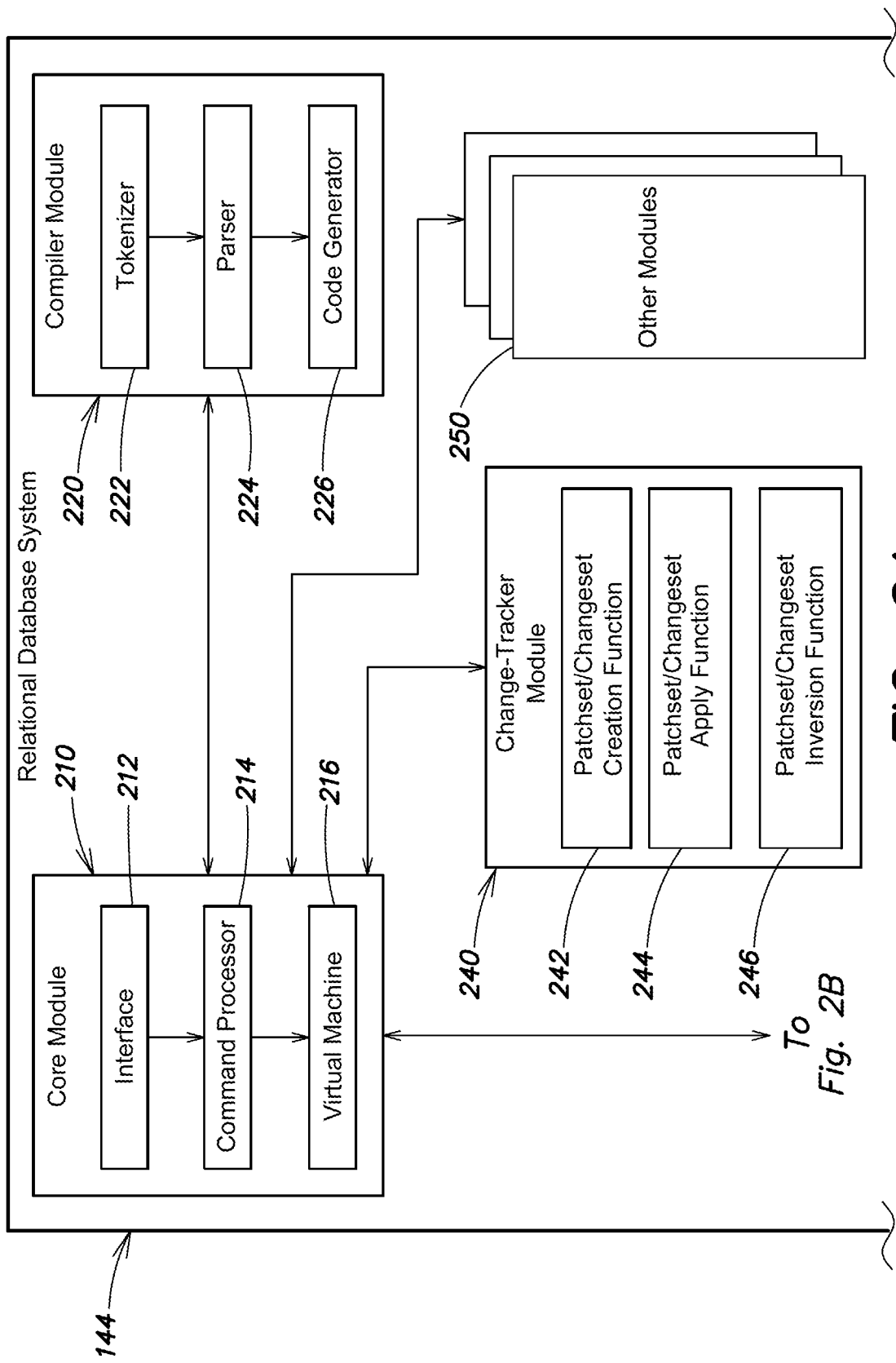
FIGS. 2A and 2B are a block diagram of an example software architecture of a relational database system.
Figure 2B:
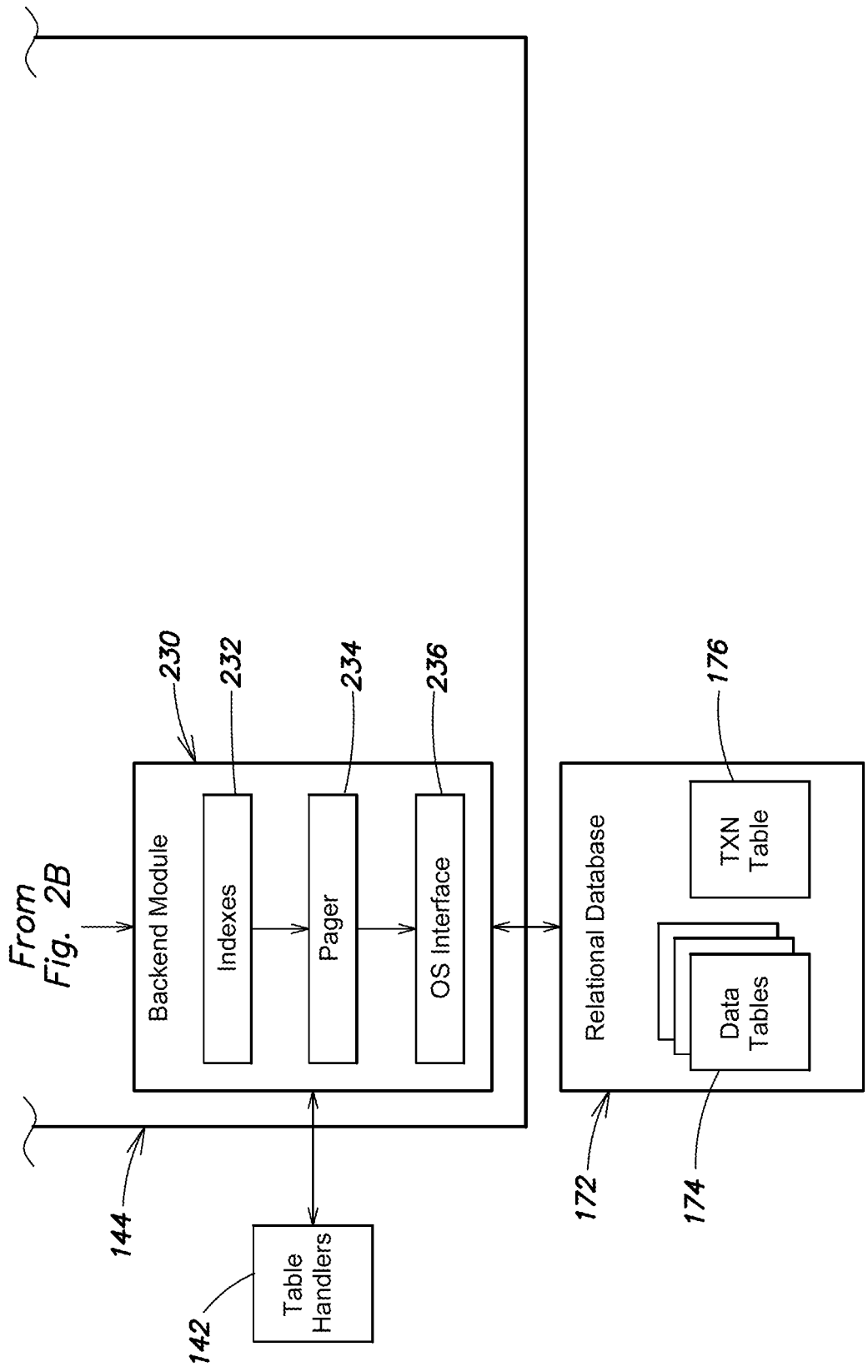

FIGS. 2A and 2B are a block diagram of an example software architecture 200 of a relational database system 144 (e.g., an embedded SQL database system). The relational database system 144 may include a number of primary functional modules, such as a core module 210, a compiler module 220, a backend module 230, as well as a change-tracker module 240 and other modules 250. The core module 210 includes an interface 212 for receiving strings of statements (e.g., SQL statements) for storing, accessing, or modifying application data stored by the relational database system 144. The statements may be organized into transactions that represent discreet units of work to perform against the relational database 172. A transaction may be initiated by a particular statement (e.g., an SQL BEGIN statement) and committed against the relational database in response to another particular statement (e.g., an SQL COMMIT statement).

The core module 210 also includes a command processor 214 that operates upon the statements. Among other operations, the command processor 214 may pass strings to a tokenizer 222 of the compiler module 220. The tokenizer 222 breaks up the original string of statements (including those in transactions) into tokens, and passes those tokens, for example, one-by-one, to a parser 224. The parser 224 assigns meaning to the tokens based on their context, and assembles them. After the parser 224 assembles the tokens, it may call a code generator 226 of the compiler module 220. The code generator 226 produces virtual machine code that will perform the tasks that the statements request. The virtual machine code is returned to the command processor 214 and is executed by a virtual machine 216 of the core module 210. The virtual machine 216 implements an abstract computing engine adapted to manipulate application stored in data tables 174 of the relational database 172.

The data stored in the data tables 174 is generally organized according to one or more indexes 232 managed by the backend module 230. A pager 234 of the backend module may be used to retrieve application data related to nodes of an index. Data may be accessed in fixed size chunks, and the pager 234 may be responsible for reading and writing these chunks. To perform reads and writes, the pager 234 may interact with an OS interface 236 that provides an abstraction layer for communicating with the operating system 135 of the electronic device 100. When writes are performed, the backend module 230 may generate events including information about any changed rows of the data tables 174 (e.g., any inserted, deleted or updated rows). The events may include a primary key as well as a description of the change. One or more table handlers 142 of the application 100 may monitor for events, and, in response to detecting events, trigger an update to the in-memory copy of application data 146 to ensure it is synchronized with the application data stored in the data tables 174 of the relation database 172.

Further, a change-tracker module 240 (e.g., an SQL session module) may interoperate with the core module 210 to track changes (e.g., inserts, deletes or updates) made to the data tables 174 of the relational database 172. The change-tracker module 240 may accumulate changes of a transaction in response to detecting a particular statement (e.g., an SQL BEGIN statement) and populate a buffer with the changes. The change-tracker module 240 may detect when the transaction is to be committed (e.g., detect an SQL COMMIT statement using an OnCommit method), and call a. The patchset/changeset creation function 242 takes the buffer, and generates therefrom a patchset or changeset that describes the "net" changes made to data tables 174 of the relational database 172 that have primary keys. A patchset may include a description of one or more changes made to one or more rows of one or more data tables 174 of the relational database 172, where the description includes the original values of one or more fields of the rows. For inserts, a patchset typically contains only the primary key value. For deletes and updates, a patchset may contain argument values. A changeset may include a description of one or more changes made to one or more rows of one or more data tables 174 of the relational database 172, where the description includes the primary key and the original values of one or more fields of the rows and the changed values of those fields. The change-tracker module 240 may atomically store the generated patchset or changeset to a TXN table 176 of the relational database 172 in the transaction.

The change tracker module 240 may utilize a patchset/changeset apply function 244 that applies changes described by a patchset or changeset to the data tables 174 of the relational database 172. Certain conflict checking may be performed. For example, when inserting rows, the patchset/changeset apply function 244 may verify that the relevant data tables do not already contain rows with the same primary key value(s). When deleting or updating rows, the patchset/changeset apply function 244 may verify that the relevant data tables contains rows with the same primary key value(s). If changesets are used, conflicts may be generated if the column values are not the same as the original values.

The change tracker module 240 may further utilize a patchset/changeset inversion function 246 that inverts changes of a patchset or changeset, to produce an inverted patchset or changeset. The patchset/changeset inversion function 246 may perform the inversion by converting any inserts into deletes (e.g., creating from an insert statement a corresponding delete statement having the same primary key), converting any deletes into inserts (e.g., creating from a delete statement having a primary key and a set of arguments a corresponding insert statement having the same primary key and set of arguments) and reversing the effects of any updates (e.g., creating from an update statement having a primary key and new property values and old property values an update statement having the primary key and with the new property values and the old property values exchanged). For patchsets, which typically do not maintain a record of the changed values in the patchset itself, the changed values may be obtained by querying the data tables 174 of the relational database 172. In contrast, changesets, which typically do maintain a record of the changed values, may be inverted without querying the data tables 174 of the relational database 172

Figure 3:
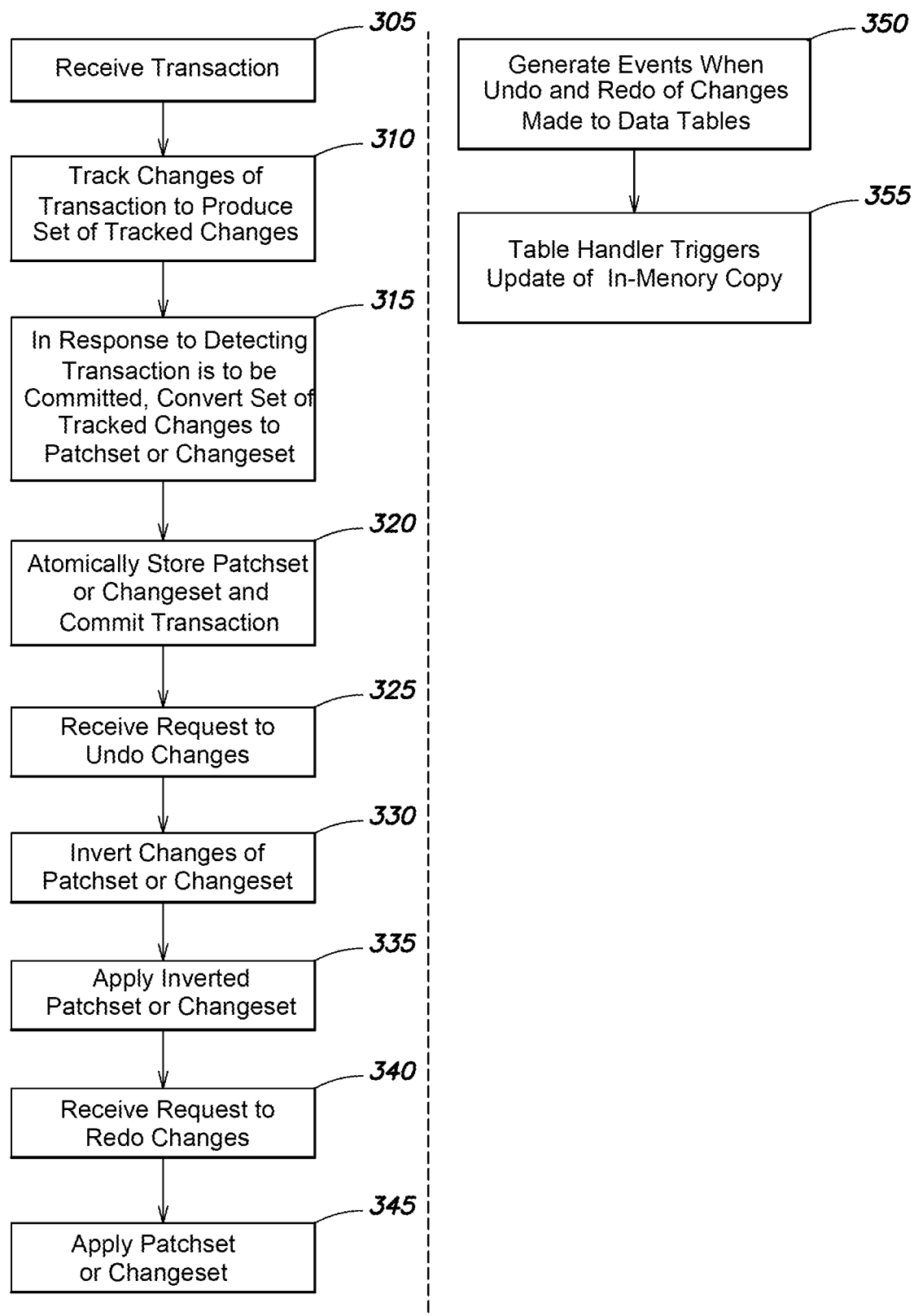
FIG. 3 is a flow diagram of an example sequence of steps that may utilize the hardware and software of FIGS. 1-2 to implement undo and redo operations using patchsets or changesets.

FIG. 3 is a flow diagram of an example sequence of steps that may utilize the hardware and software of FIGS. 1-2 to implement undo and redo operations using patchsets or changesets. At step 305, the relational database system 144 receives from the application 140 a transaction to be performed against the data tables 174 of the relational database 172 to reflect changes made by the application (e.g., based on user input in a user interface of the application, or programmatically). At step 310, in response to detecting the transaction is initiated (based on an SQL BEGIN statement), the change-tracker module 240 tracks the changes of the transaction to produce a set of tracked changes that are maintained in a buffer. At step 315, in response to detecting that the transaction is to be committed (e.g., in response to detecting an SQL COMMIT statement), the change-tracker module (e.g., using the patchset/changeset creation function 242) converts the set of tracked changes in the buffer into a patchset or changeset. Then, at step 320, the patchset or changeset is atomically stored to a TXN table 176 of the relational database 172 in the same transaction. In this manner, there will always be one row in the TXN table for every reversible set of changes to the relational database.

Subsequently, at step 325, the relational database system 144 may receive a request to undo the changes from the application 140 (e.g., issued by the application in response to a user-selection of an undo interface element in its user interface, or programmatically). At step 330, in response to the request to undo, the change-tracker module 240 (e.g., using the patchset/changeset inversion function 246) inverts the changes of the patchset or changeset (e.g., converting any inserts into deletes, converting any deletes into inserts, and reversing the effect of any updates) to produce an inverted patchset or changeset. Then, at step 335, the change-tracker module 240 (e.g., using the patchset/changeset apply function 244) applies the inverted patchset or changeset to the relational database 174 to undo the changes to the data tables 174. If patchsets are used, the inverted patchset is atomically saved to the TXN table along with the reversed changes.

Still later, at step 340, the relational database system 144 may receive a request to redo the changes from the application 140 (e.g., issued by the application in response to a user-selection of a redo interface element in its user interface). If patchsets are used, the inverted patchset is re-inverted to obtain the original patchset. At step 345, the change-tracker module 240 (e.g., using the patchset/changeset apply function 244) applies the original patchset or changeset to the relational database 174 to redo the changes to the data tables 174.

In parallel to steps 310-345, at step 350, the backend module 230 of the relational database system 144 generates events when changes of an undo or redo are made to the data tables 174. At step 355, such events are received by the table handlers 142 of the application 140, which triggers the application to update at least a portion of its in-memory copy of application data.

The operations of FIG. 3 may be illustrated by reference to example. It should be understood that the following example has been simplified for purposes of illustration, and that the application data, and the operations performed thereon in an actual implementation, will generally be far more complex.

Figure 4:
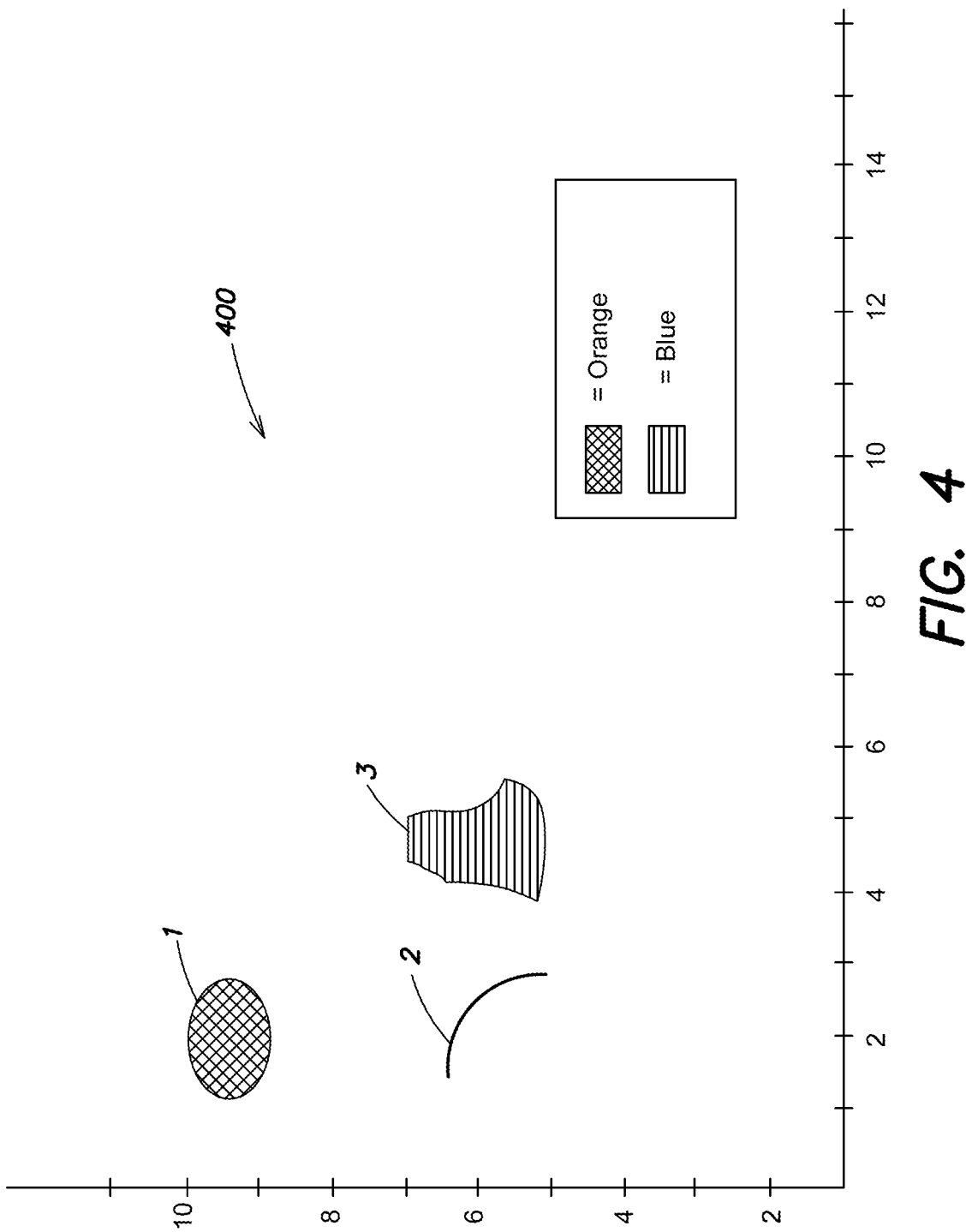
FIG. 4 is a graphical representation of example elements of a model that may be stored as application data in data tables of a relational database.

FIG. 4 is a graphical representation 400 of example elements 1-3 of a model that may be stored as application data in data tables 174 of a relational database 172. Each element 1-3 has a geometry, a location and a color, among other properties specific to the element or of a category to which the element belongs.

Figure 5:
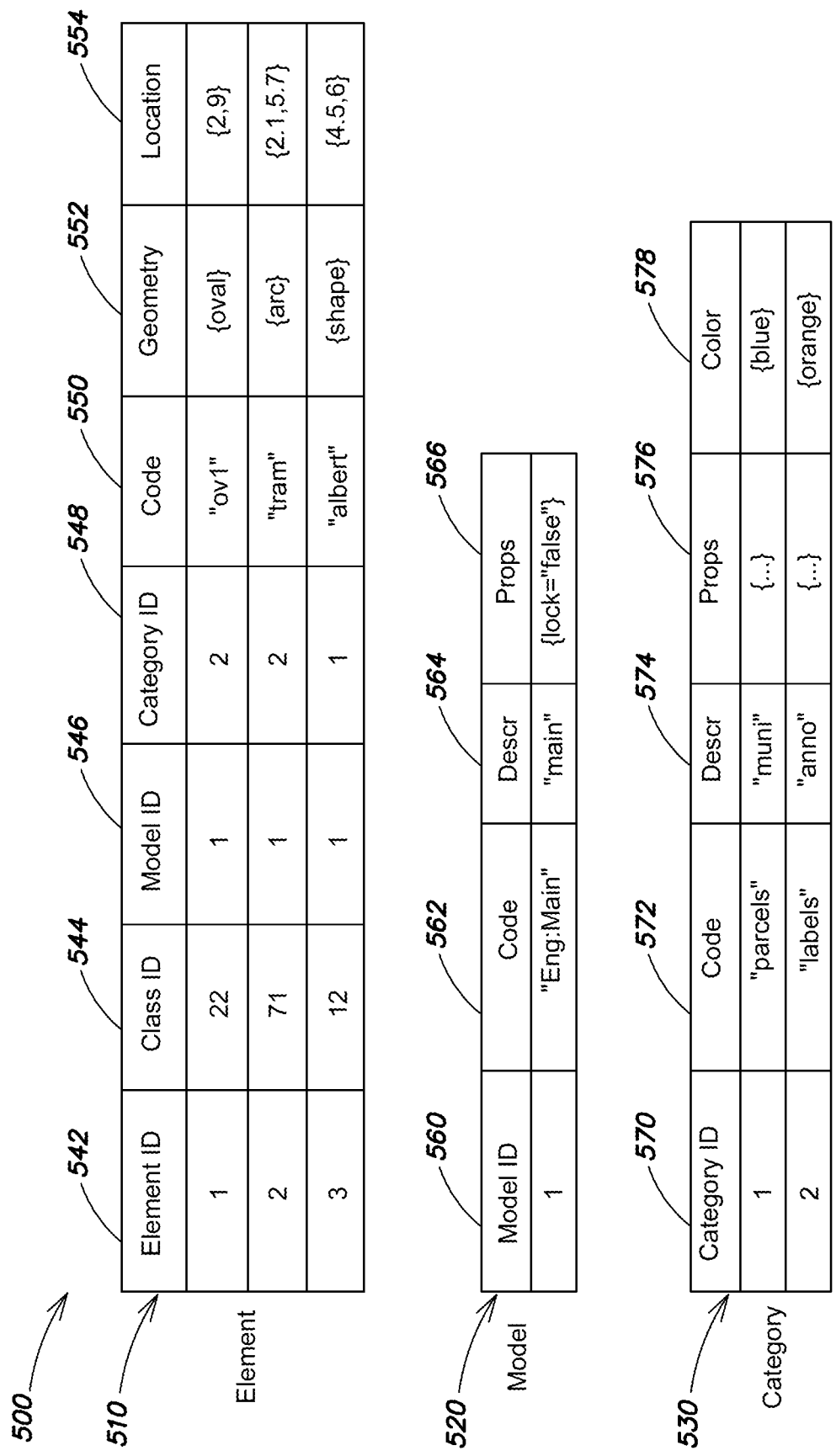
FIG. 5 is a listing of example data tables that may be stored in a relational database to represent the elements of FIG. 4.

FIG. 5 is a listing 500 of example data tables 510-530 that may be stored in the relational database 172 to represent the elements 1-3 of FIG. 4. The data tables include an element table 510, a model table 520 and a category table 530. The element table 510 includes rows that represent the elements 1-3, and columns that store indexes and properties specific to the elements, including: an element identifier (ID) 542, a class ID, a model ID 546, a category ID 548, a code 550, a geometry 552, and a location 554. The model table 520 includes rows that represent each model, and columns that store indexes and properties of the model, including: a model ID 560, a code 562, a description 564, and further properties 566. The category table 530 includes rows that represent categories to which elements may belong, and columns that store indexes and properties that are common to elements of the same category, including: a category ID 570, a code 572, a description 574, further properties 576, and (in this example) a color 578.

Figure 6:
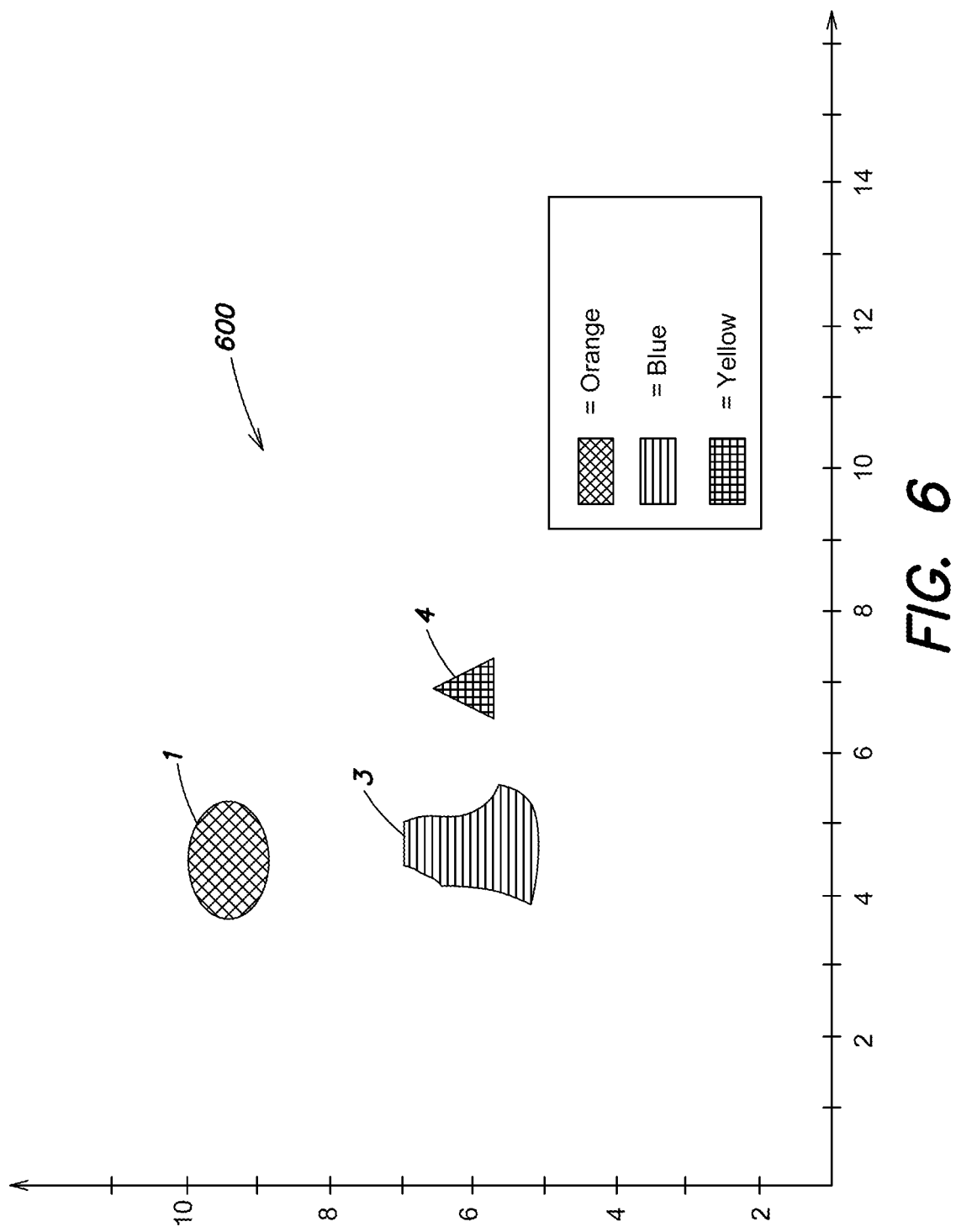
FIG. 6 is a graphical representation showing changes of a first transaction to the elements of the graphical representation of FIG. 4.

FIG. 6 is a graphical representation 600 showing changes of a first transaction to the elements of the graphical representation 400 of FIG. 4 (e.g., made by the application 140 in response to user input in a user-interface of the application, or programmatically). The first transaction includes the deletion of element 2, the insertion of element 4 which is associated with a new model (i.e. model 2) and a new color (i.e. yellow), and the update of element 1 to change its location. The changes are tracked by the change-tracker module 240 when performed against the example data tables 510-530 of FIG. 5, to produce a first changeset.

FIG. 7 is an example first changeset 700 that is produced by the change-tracker module 240 (e.g., using the patchset/changeset creation function 242) in response to detecting the first transaction. The example first changeset 700 is atomically stored when changes to the example data tables 510-530 of FIG. 5 are committed.

FIG. 8 is a listing 800 of updated data tables 810-830 showing the effect of the first transaction being committed against the data tables 520-530 of FIG. 5.

Figure 9:
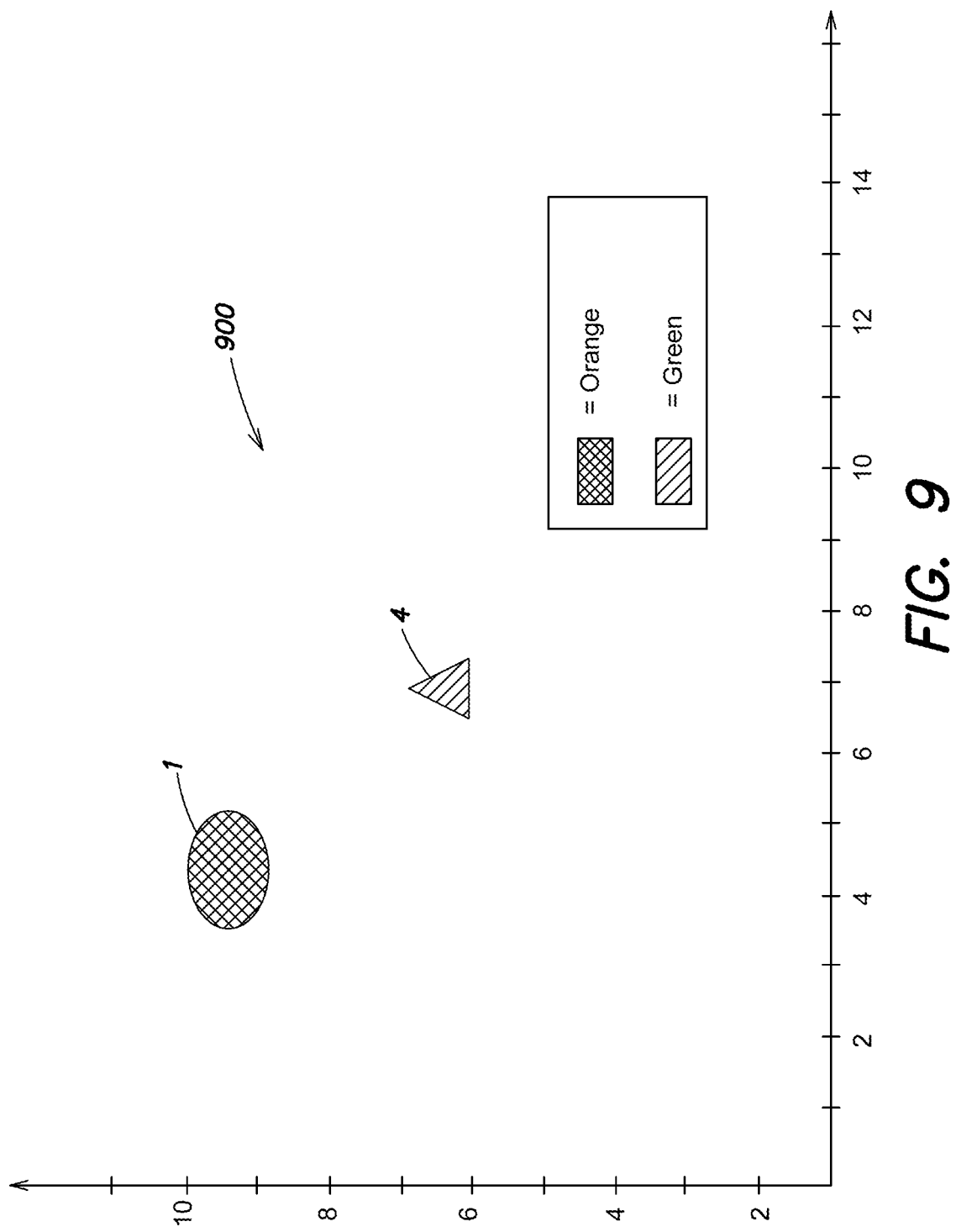
FIG. 9 is a graphical representation showing changes of a second transaction to the elements of the graphical representation of FIG. 6.

FIG. 9 is a graphical representation 900 showing changes of a second transaction to the elements of the graphical representation 600 of FIG. 6 (e.g., made by the application 140 in response to user input in a user-interface of the application, or programmatically). The second set of changes includes the deletion of element 3 and an update of element 4 to change its color (i.e. from yellow to green). The changes are tracked by the change-tracker module 240 when performed against the example data tables 810-830 of FIG. 8 to produce a second changeset.

FIG. 10 is an example second changeset 1000 that is produced by the change-tracker module 240 (e.g., using the patchset/changeset creation function 242) in response to detecting the second transaction. The example second changeset 1000 is atomically stored when changes to the example data tables 810-830 of FIG. 8 are committed.

Figure 11:
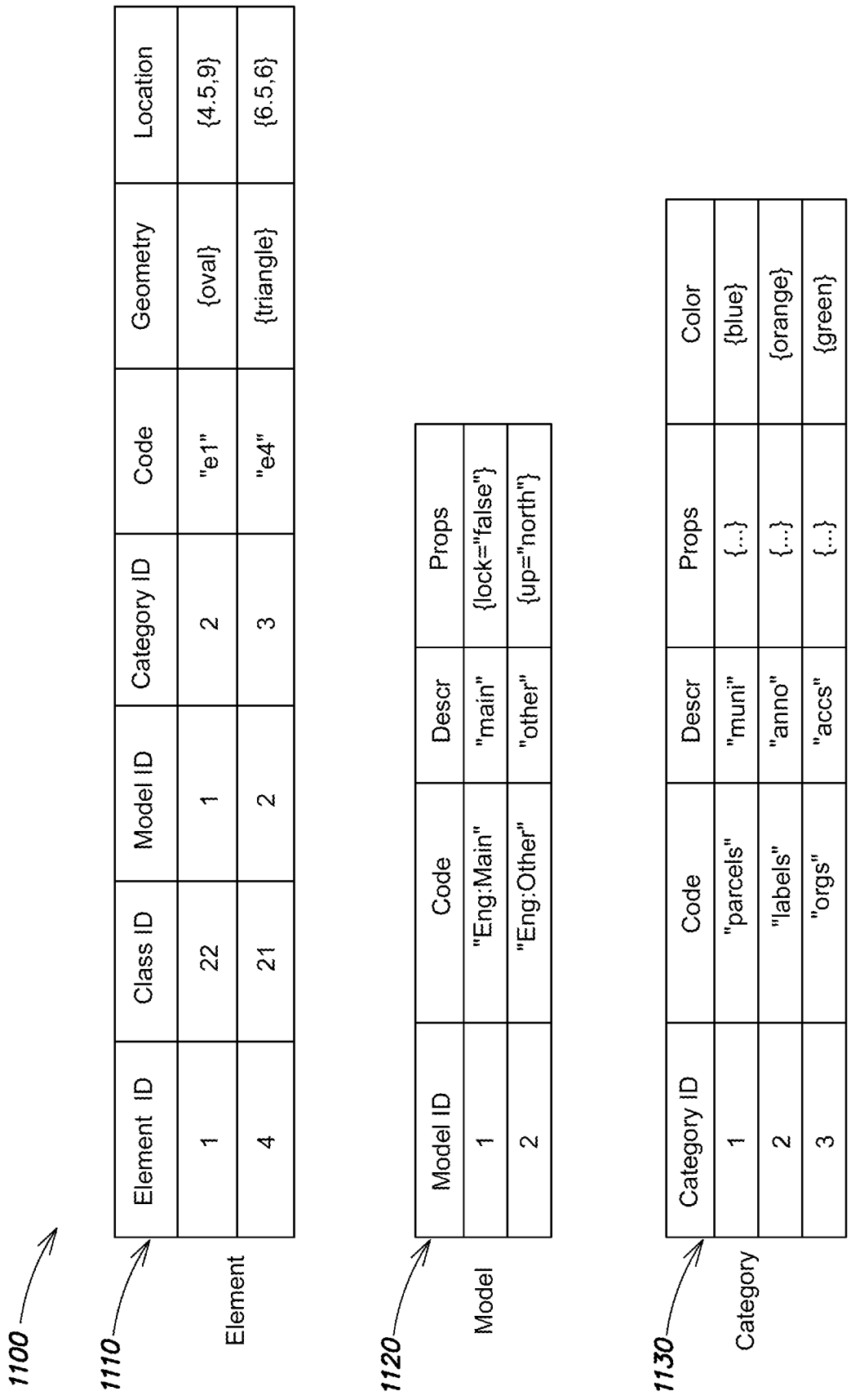
FIG. 11 is a listing of further updated data tables showing the effects of the second transaction being committed against the already updated data tables of FIG. 8.

FIG. 11 is a listing 1100 of further updated data tables 1110-1130 showing the effects of the second transaction being committed against the already updated data tables 810-830 of FIG. 8.

FIG. 12 is an example inverted second changeset 1200 that is produced by the change-tracker module 240 (e.g., using the patchset/changeset inversion function 246) in response to a request from the application 140 to undo the changes of the second transaction (e.g., issued by the application in response to a user-selection of an undo interface element). The example inverted second changeset 1200 shows the delete of element 3 replaced by an insert with the same arguments, and the update of category 3 modified to exchange the old and new color values (here, changing green back to yellow). The inverted second changeset 1200 is applied against the data tables 1110-1130 of FIG. 11, to effectively roll them back to the same state as the data tables 810-830 of FIG. 8. The table handlers 142 of the application 140 may receive an event when this occurs, and trigger an update to an in-memory copy of the application data 146 related to the updated tables.

Figure 13:
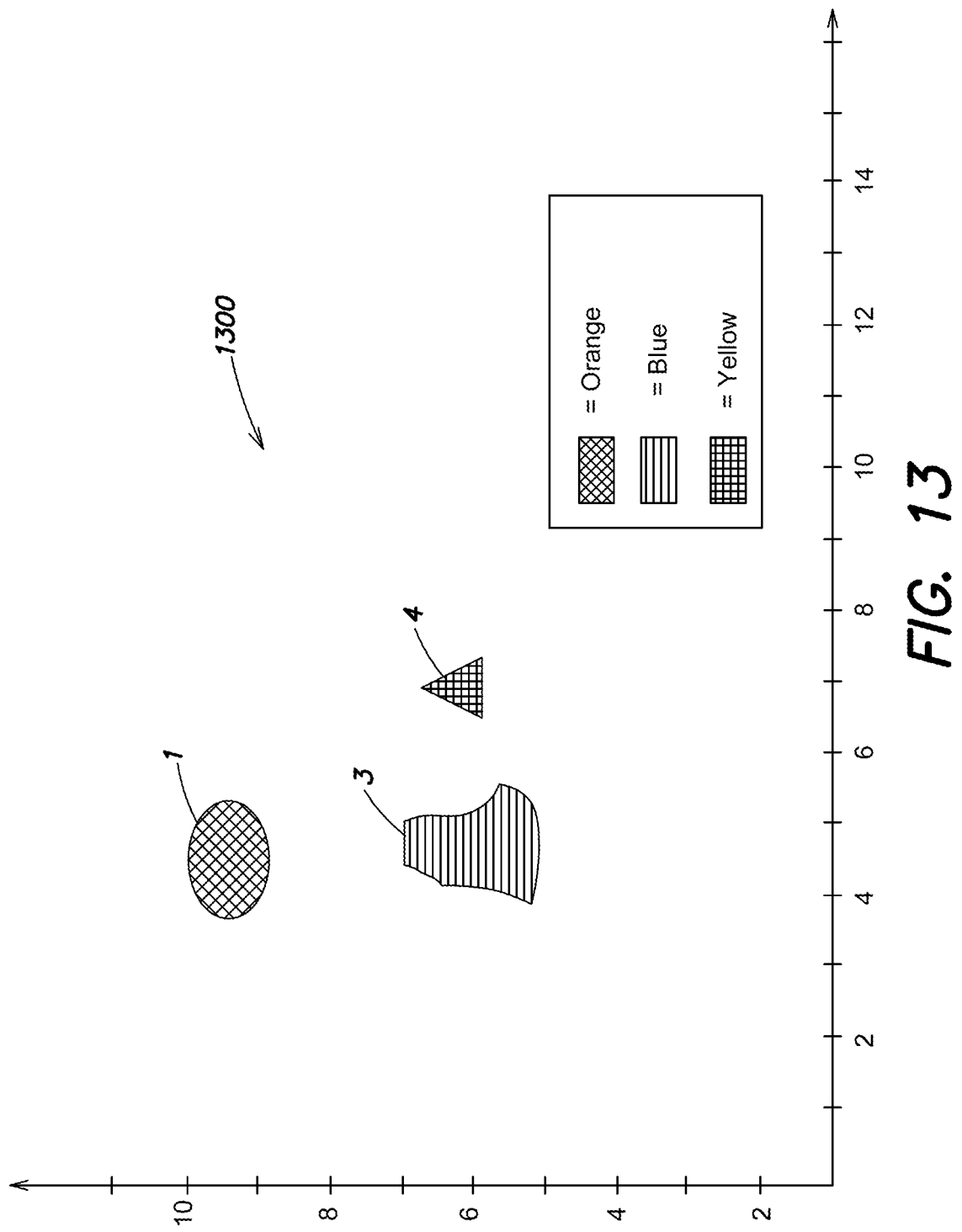
FIG. 13 is a graphical representation showing the effects of the change-tracker module applying the inverted second patchset.

FIG. 13 is a graphical representation 1300 showing the effects of the change-tracker module 240 (e.g., using the patchset/changeset apply function 244) applying the inverted second changeset 1300. The elements are shown effectively back in the same state as in FIG. 6.

FIG. 14 is an example inverted first changeset 1400 that is produced by the change-tracker module 240 (e.g., using the patchset/changeset inversion function 246) in response to a request from the application 140 to undo changes of the first transaction (e.g., issued by the application in response to a user-selection of an undo interface element). The example inverted first changeset 1400 shows the deletion of element 2 of the first changeset replaced by an insert with the same arguments, the deletion of element 4, and its associated model (i.e. model 2) and category (i.e. category 3), and the update of element 1 to exchange old and new location values. The inverted first changeset 1400 is applied against the data tables 810-830 of FIG. 8 to effectively roll them back to the same state as the data tables 510-530 of FIG. 5. Again, the table handler 142 of the application 140 may receive an event when this occurs, and trigger an update to an in-memory copy s of the data 246 related to the updated tables.

Figure 15:
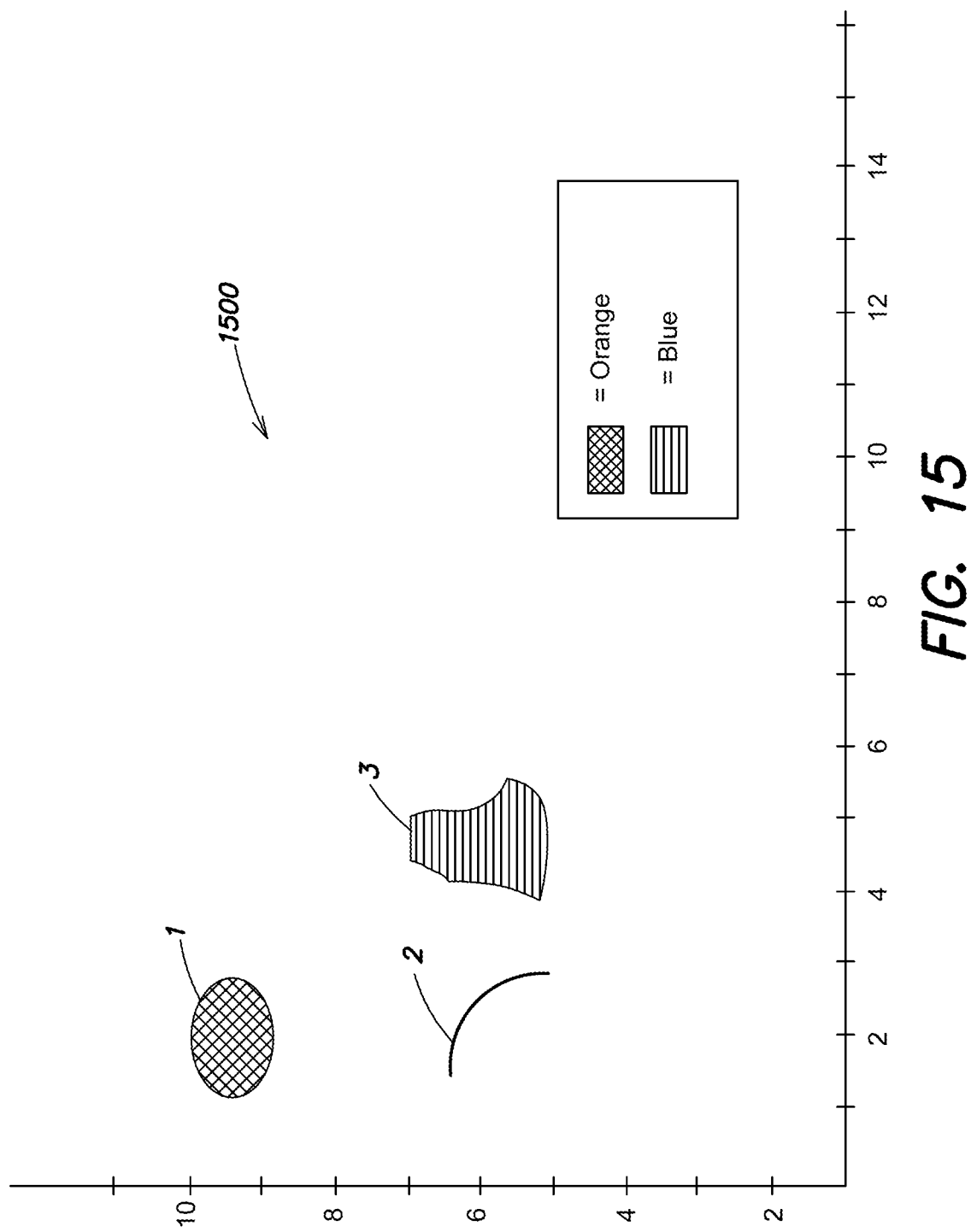
FIG. 15 is a graphical representation showing the effects of the change-tracker module applying the inverted first patchset.

FIG. 15 is a graphical representation 1500 showing the effects of the change-tracker module 240 (e.g., using the patchset/changeset apply function 244) applying the inverted first changeset 1400. The elements are shown effectively back in the same state as in FIG. 4.

Concluding Comments

It should be understood that various adaptations and modifications may be made to the above discussed techniques for implementing an undo operation in an application that stores application data using a relational database system. While it is discussed above that the application 140, relational database system 144 and relational database 172 are all resident on a single electronic device 100, it should be understood that, in alternative embodiments, such application, system and database, and/or portions of such application, system and database, may be distributed across a number of electronic devices, according to client-server architectures, peer-to-peer architectures, client-queue-client architectures, and the like. Further, it should be understood that at least some of the functionality suggested above to be implemented in software may be implemented in hardware. In general, functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile memory, a persistent storage device, or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components. Above all, it should be understood that the above embodiments are meant to be taken only by way of example.

What is claimed is:

1. A method for implementing an undo operation in an application that stores application data using a relational database system, the method comprising:

receiving, by the relational database system executing on an electronic device from the application, a transaction to be performed against a relational database, the transaction including a plurality of changes to be performed on one or more rows of one or more data tables of the relational database to reflect changes made by the application;

tracking the plurality of changes of the transaction by a module of the relational database system to produce a set of tracked changes;

in response to detecting the transaction is to be committed to the one or more data tables of the relational database, converting the set of tracked changes to a patchset or changeset that includes a plurality of relational database statements with arguments specifying original values of the one or more rows of one or more data tables, the relational database statements including a plurality of delete statements, insert statements or update statements to be performed on the one or more data tables;

atomically storing the patchset or changeset to a transaction table of the relational database and committing the transaction to the one or more data tables of the relational database;

receiving, by the relational database system from the application, a request to undo the changes made by the application;

inverting each of the plurality of changes of the patchset or changeset to produce an inverted patchset or changeset, the inverting to produce new relational database statements by converting any insert statements into delete statements, any delete statements into insert statements, and reversing effects of any update statements using the original values included in the arguments of the relational database statements in the patchset or changeset; and applying the inverted patchset or changeset to the relational database to undo the plurality of changes to the one or more rows of the one or more data tables.

2. The method of claim 1, wherein the application is a computer aided design (CAD) application, the one or more data tables describe elements organized into one or more models of a physical structure, and the changes by the application reflect changes to one or more elements or models.

3. The method of claim 2, wherein the one or more data tables of the relational database include at least an element table and a model table.

4. The method of claim 1, wherein the converting any insert statements into delete statements creates from an insert statement in the patchset or changeset having a primary key a corresponding delete statement in the inverted patchset or changeset having the same primary key.

5. The method of claim 1, wherein the converting any delete statements into insert statements creates from a delete statement in the patchset or changeset having the primary key and a set of arguments a corresponding insert statement in the inverted patchset or changeset having the same primary key and set of arguments.

6. The method of claim 1, wherein the original values include new property values and old property values and the reversing effects of any update statements creates from an update statement in the patchset or changeset having the primary key, the new property values and the old property values an update statement in the inverted patchset or changeset having the same primary key and with the new property values and the old property values exchanged.

7. The method of claim 1, wherein the relational database is stored in a non-volatile storage device of the electronic device, and the method further comprises:
maintaining, by the application, an in-memory copy of at least some of the application data of the relational database in a volatile memory of the electronic device;
generating, by the relational database system, an event when the undo of the plurality of changes to the one or more rows of the one or more data tables is performed;
receiving the event at one or more table handlers of the application; and
in response to the event, updating at least a portion of the in-memory copy of the application data related to the one or more data tables.

8. The method of claim 1, further comprising:
receiving, by the relational database system from the application, a request to redo the changes made by the application; and
applying the patchset or changeset to the relational database to redo the plurality of changes to the one or more rows of the one or more data tables.

9. The method of claim 1, wherein the relational database system is an SQL relational database system.

10. The method of claim 9, wherein the tracking detects a transaction in response to an SQL BEGIN statement, and the detecting detects the transaction is to be committed in response an SQL COMMIT statement.

11. A non-transitory electronic device-readable medium containing executable instructions to implement a redo operation in an application that stores application data using a relational database system, the executable instructions, when executed by one or more processors of an electronic device, operable to:

receive a transaction to be performed against a relational database, the transaction including a plurality of changes to be performed on one or more rows of one or more data tables of the relational database to reflect changes made by the application;
track the plurality of changes of the transaction to produce a set of tracked changes;
in response to detecting the transaction is to be committed to the one or more data tables of the relational database, convert the set of tracked changes to a patchset or changeset that includes a plurality of relational database statements with arguments specifying original values of the one or more rows of one or more data tables, the relational database statements including a plurality of delete statements, insert statements or update statements to be performed on the one or more data tables;
atomically store the patchset or changeset to a transaction table of the relational databases database and commit the transaction to the one or more data tables of the relational database;
receive a request to redo the changes made by the application; and
apply the patchset or changeset to the relational database to redo the plurality of changes to the one or more rows of the one or more data tables.

12. The non-transitory electronic device-readable medium of claim 11, wherein the application is a computer aided design (CAD) application, the one or more data tables describe elements organized into one or more models of a physical structure, and the changes by the application reflect changes to one or more elements or models.

13. The non-transitory electronic device-readable medium of claim 12, wherein the one or more data tables of the relational database include at least an element table and a model table.

14. The non-transitory electronic device-readable medium of claim 12, wherein executable instructions, when executed by the one or more processors of the electronic device, are further operable to:
prior to receipt of the request to redo the changes, receive a request to undo the changes made by the application;
invert each of the plurality of changes of the patch set or changeset to produce an inverted patchset or changeset, the inversion to produce new relational database statements by converting any insert statements into delete statements, any delete statements into insert statements, and to reverse effects of any update statements using the original values included in the arguments of the relational database statements in the patchset or changeset; and
apply the inverted patchset or changeset to the relational database to undo the plurality changes to the one or more rows of the one or more data tables.

15. The non-transitory electronic device-readable medium of claim 12, wherein the relational database system is an SQL relational database system.

16. An electronic device configured to implement an undo operation and a redo operation in an application that stores application data using a relational database system, the electronic device comprising:
a display screen;
a processor configured to execute executable instructions; and
a memory configured to store the executable instructions and data, the executable instructions and data including:

a relational database having one or more data tables that describe an entity and a transaction table;

an application configured to present a user interface on the display screen having interface elements using which a user may make changes to the entity, make a request to undo the changes made to the entity, and make a request to redo the changes made to the entity, and the relational database system configured to, in response to the changes to the entity, receive from the application a transaction to be performed against the relational database, the transaction to include a plurality of changes to be performed on one or more rows of one or more data tables of the relational database to reflect changes made to the entity, track the plurality of changes of the transaction to produce a set of tracked changes, convert the set of tracked changes to a patchset or changeset that includes a plurality of relational database statements with arguments specifying original values of the one or more rows of one or more data tables, the relational database statements including a plurality of delete statements, insert statements or update statements to be performed on the one or more data tables, and store the patchset or changeset to the transaction table, and in response to the request to undo the changes made to the entity, invert each of the plurality of changes of the patchset or changeset to produce an inverted patchset or changeset, the inverting to produce new relational database statements by converting any insert statements into delete statements, any delete statements into insert statements, and reversing effects of any update statements using the original values included in the arguments of the relational database statements in the patchset or changeset, and apply the inverted patchset or changeset to the relational database to undo the plurality of changes to the one or more rows of the one or more data tables, and in response to the request to redo the changes made to the entity, apply the patchset or changeset to the relational database to redo the plurality of changes to the one or more rows of the one or more data tables.

17. The electronic device of claim 16, wherein the application is a computer aided design (CAD) application and the entity is a project that includes one or more models and elements thereof that describe a physical structure.

* * * * *

UNITED STATES PATENT AND TRADEMARK OFFICE
CERTIFICATE OF CORRECTION

| | |
|---|---|
| PATENT NO. | : 10,733,057 B2 |
| APPLICATION NO. | : 14/928614 |
| DATED | : August 4, 2020 |
| INVENTOR(S) | : Keith A. Bentley |

Page 1 of 2

It is certified that error appears in the above-identified patent and that said Letters Patent is hereby corrected as shown below:

In the Specification

Column 1, Line 17 reads:
"Many relational data-bases utilize a version of the SQL"
Should read:
--Many relational databases utilize a version of the SQL--

Column 1, Line 20 reads:
"a relational data-base system implemented by a self-con-"
Should read:
--a relational database system implemented by a self-con- --

Column 4, Line 56 reads:
"nonvolatile storage device 170."
Should read:
--non-volatile storage device 170.--

Column 9, Line 56 reads:
"an in-memory copy s of the data 246 related to the updated"
Should read:
--an in-memory copy of the data 246 related to the updated--

In the Claims

Column 12, Line 19 Claim 11 reads:
"table of the relational databases database and commit"
Should read:
--table of the relational database and commit--

Signed and Sealed this
Fifth Day of January, 2021

Andrei Iancu
*Director of the United States Patent and Trademark Office*

Column 12, Line 43 Claim 14 reads:
"invert each of the plurality of changes of the patch set or"
Should read:
--invert each of the plurality of changes of the patchset or--